(12) United States Patent
Yamashita et al.

(10) Patent No.: US 11,515,531 B2
(45) Date of Patent: Nov. 29, 2022

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Yasunobu Yamashita, Tokyo (JP); Keigo Hoshina, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 187 days.

(21) Appl. No.: 16/802,643

(22) Filed: Feb. 27, 2020

(65) Prior Publication Data
US 2021/0083277 A1   Mar. 18, 2021

(30) Foreign Application Priority Data

Sep. 13, 2019 (JP) .............................. JP2019-167637

(51) Int. Cl.
*H01M 4/48* (2010.01)
*H01M 4/485* (2010.01)
*H01M 10/42* (2006.01)
*H01M 4/02* (2006.01)

(52) U.S. Cl.
CPC .......... *H01M 4/483* (2013.01); *H01M 4/485* (2013.01); *H01M 10/425* (2013.01); *H01M 2004/021* (2013.01); *H01M 2220/20* (2013.01)

(58) Field of Classification Search
CPC .......... H01M 10/0525; H01M 10/425; H01M 2004/021; H01M 2220/20; H01M 4/131; H01M 4/483; H01M 4/485; H01M 4/66; H01M 50/509; Y02E 60/10
See application file for complete search history.

(56) References Cited

U.S. PATENT DOCUMENTS

| | | | |
|---|---|---|---|
| 2008/0063939 A1* | 3/2008 | Ryu | H01M 4/62 |
| | | | 252/182.1 |
| 2011/0195291 A1 | 8/2011 | Yokoyama et al. | |
| 2018/0034047 A1* | 2/2018 | Cho | H01M 4/364 |
| 2018/0241090 A1* | 8/2018 | Takami | B60L 58/21 |
| 2019/0341602 A1 | 11/2019 | Matsuno et al. | |
| 2020/0259162 A1* | 8/2020 | Lee | H01M 4/62 |
| 2021/0066704 A1* | 3/2021 | Verbrugge | H01M 10/446 |

FOREIGN PATENT DOCUMENTS

| | | |
|---|---|---|
| JP | 51-21126 A | 2/1976 |
| JP | 4-272654 A | 9/1992 |
| JP | 2008-071757 A | 3/2008 |
| JP | 2015-015096 A | 1/2015 |
| JP | 2018-152250 A | 9/2018 |
| JP | 2018-160420 A | 10/2018 |
| WO | WO 2010/143408 A1 | 12/2010 |

OTHER PUBLICATIONS

Abramoff et al., "Image Processing with ImageJ", reprinted from the Jul. 2004 issue of Biophotonics International, copyrighted by Laurin Publishing Co. Inc., 7 pages.

* cited by examiner

*Primary Examiner* — Victoria H Lynch
(74) *Attorney, Agent, or Firm* — Oblon, McClelland, Maier & Neustadt, L.L.P.

(57) ABSTRACT

According to one embodiment, an electrode is provided. The electrode includes an active material-containing layer. The active material-containing layer contains an active material and a flat plate-shaped silicate.

16 Claims, 7 Drawing Sheets

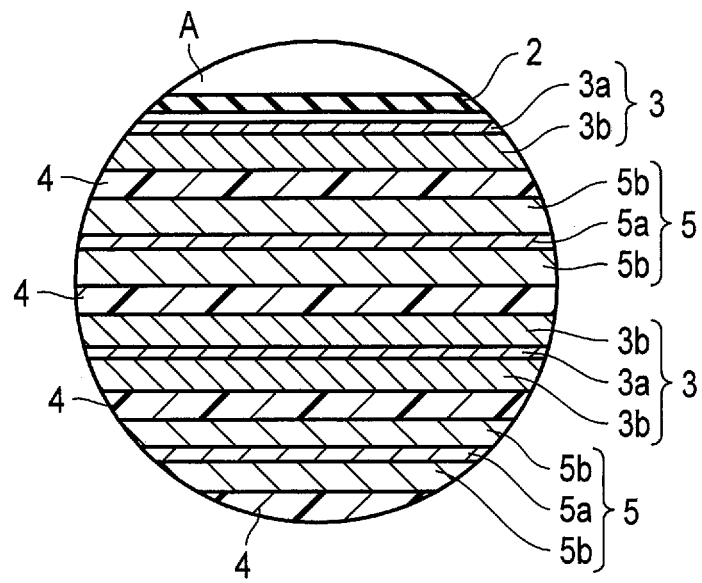
F I G. 3
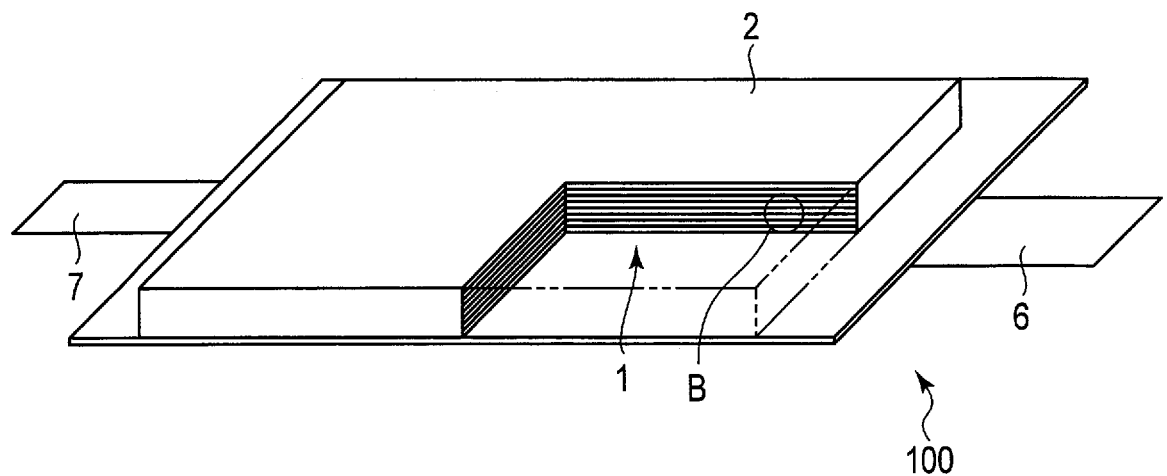
F I G. 4

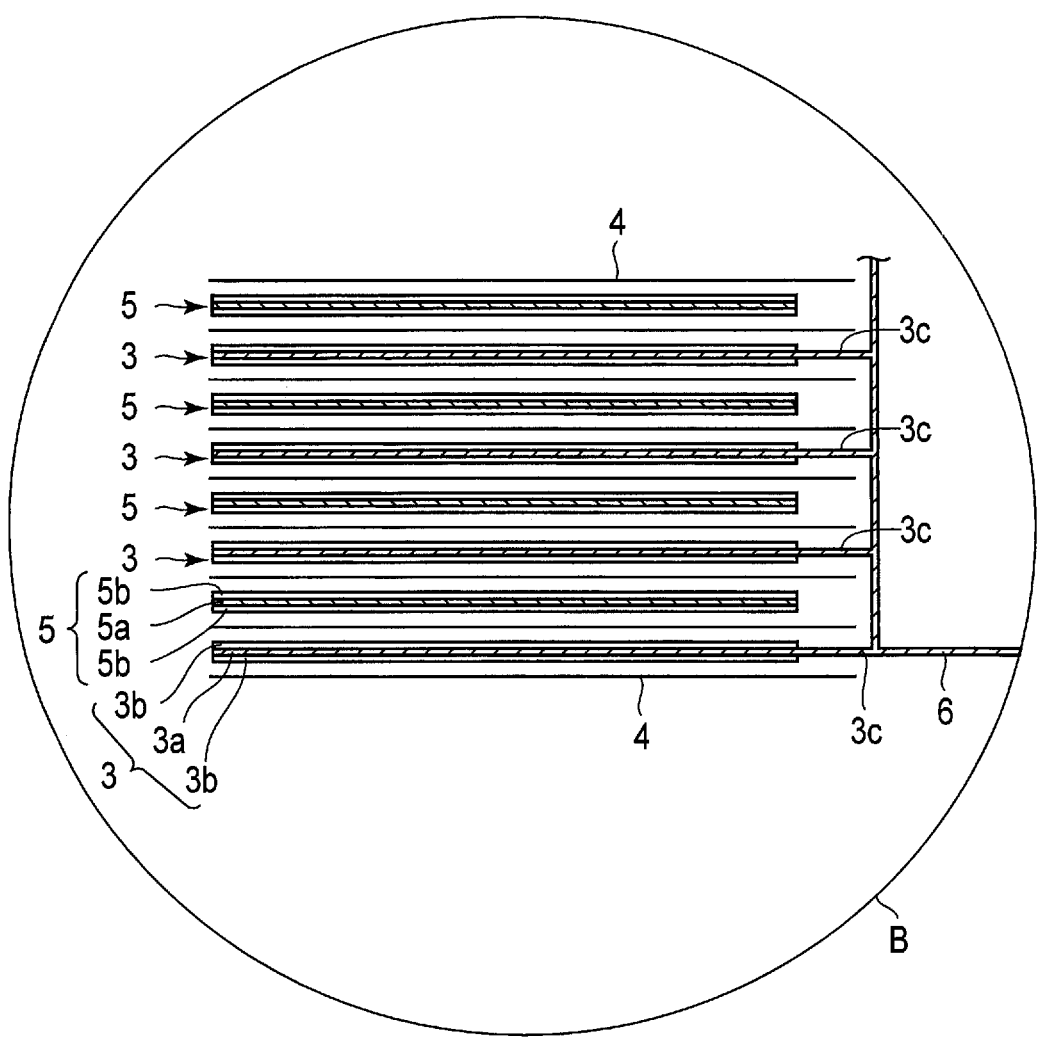
F I G. 5

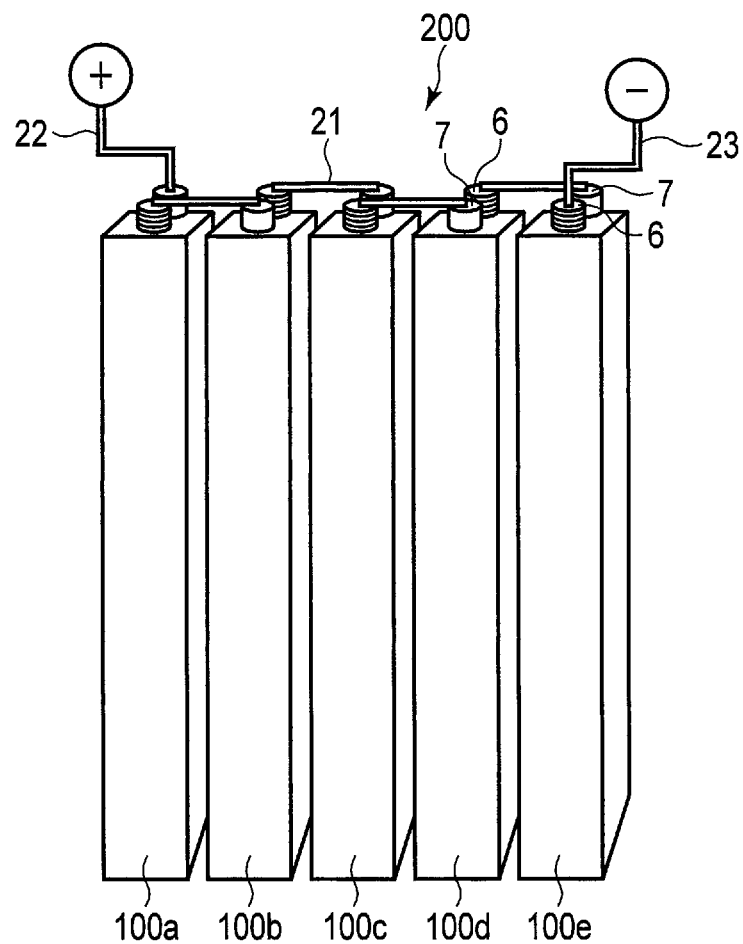
F I G. 6

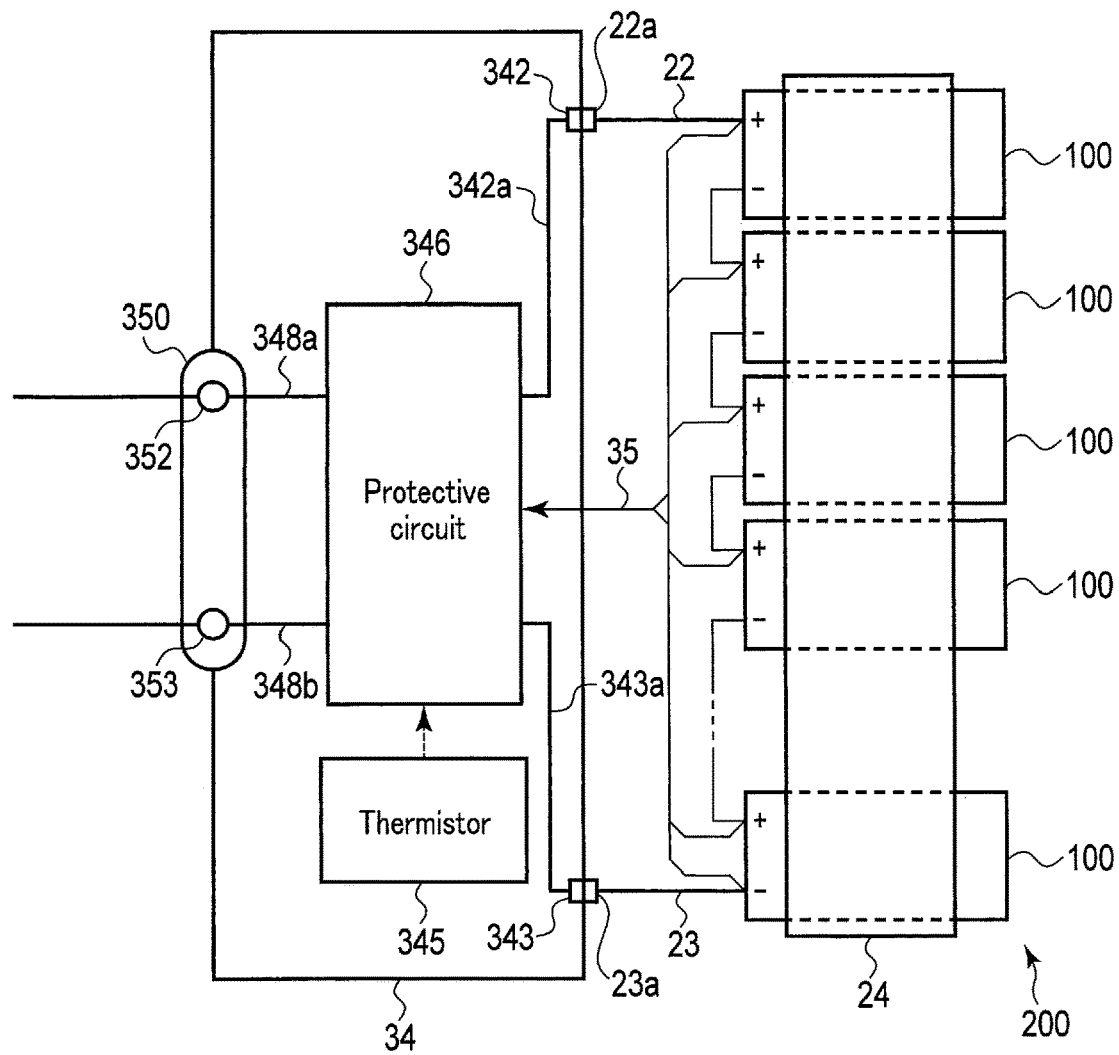
F I G. 8
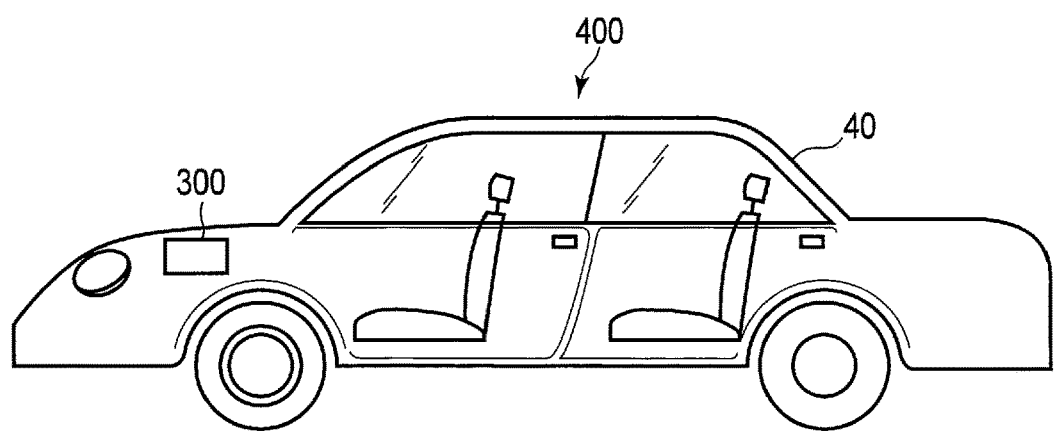
F I G. 9

ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2019-167637, filed Sep. 13, 2019, the entire contents of which are incorporated herein by reference.

FIELD

Embodiments of the present invention relate to an electrode, a secondary battery, a battery pack, and a vehicle.

BACKGROUND

When an active material-containing layer containing an active material is formed on a current collector such as a metal foil, water or an organic solvent is used as a solvent for a slurry containing active material particles, a conductive agent, a binder, and the like. When a slurry is applied onto only one surface of a current collector to prepare a one-side electrode, depending on the material contained in the slurry, when the coating film is dried, the coating film may contract and curve with the current collector in some cases.

When the one-side electrode curves, there is a problem that in a case where the slurry is further applied onto the other surface, cracks are generated in the formed active material-containing layer and a uniform electrode cannot be obtained. Moreover, there is a problem that the multiple-zone coating is difficult and the productivity is lowered.

BRIEF DESCRIPTION OF THE DRAWINGS

FIG. 3 is an enlarged cross-sectional view of a portion A of the secondary battery illustrated in FIG. 2;

FIG. 4 is a partially cut-away perspective view schematically illustrating another example of the secondary battery according to the embodiment;

FIG. 5 is an enlarged cross-sectional view of a portion B of the secondary battery illustrated in FIG. 4;

FIG. 6 is a perspective view schematically illustrating one example of a battery module according to an embodiment;

FIG. 8 is a block diagram illustrating one example of an electric circuit of the battery pack illustrated in FIG. 7;

FIG. 9 is a partially transparent diagram schematically illustrating one example of a vehicle according to an embodiment.

DETAILED DESCRIPTION

Figure 1:
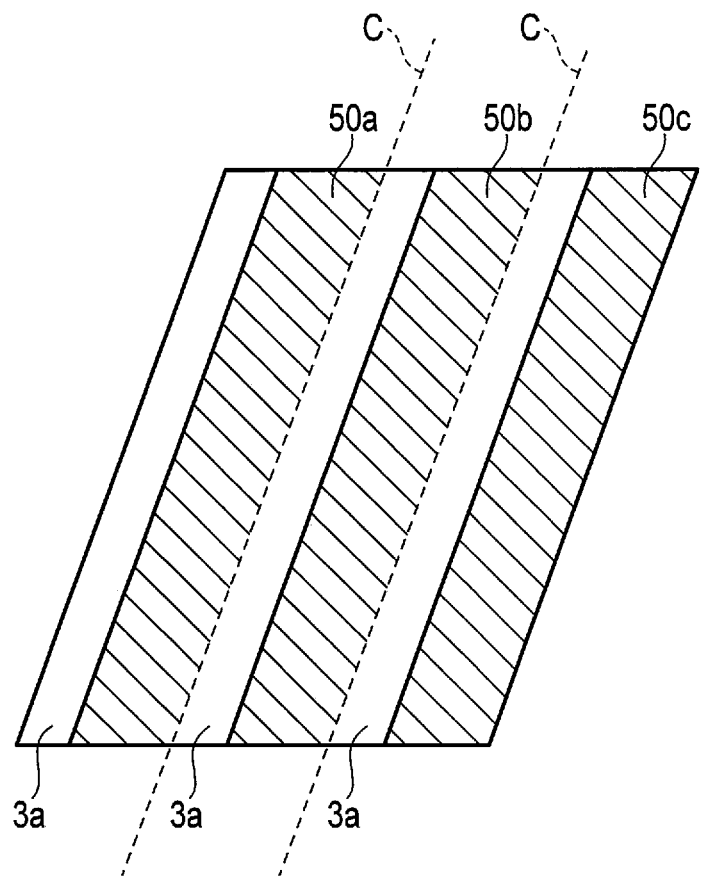
FIG. 1 is a perspective view illustrating one example of a production process of an electrode according to an embodiment.

According to the embodiment, an electrode is provided. The electrode includes an active material-containing layer containing an active material and a flat plate-shaped silicate.

According to another embodiment, a secondary battery is provided. The secondary battery includes a positive electrode, a negative electrode that is the electrode according to the embodiment, and an electrolyte.

According to another embodiment, a battery pack is provided. The battery pack includes the secondary battery according to the embodiment.

According to another embodiment, a vehicle is provided. The vehicle includes the battery pack according to the embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an electrode is provided. The electrode includes an active material-containing layer containing an active material and a flat plate-shaped silicate.

When an electrode is prepared, carboxymethyl cellulose (CMC) is generally used as a thickening agent for a slurry that uses water as the solvent. The reason for this is that CMC is an excellent thickening agent that can stably disperse a highly water-repellent material such as carbon in a water solvent. However, as a result of the studies by the present inventors, it has been found that by drying a slurry containing CMC, a current collector is curved together with the slurry. This is considered to be caused because the CMC is dehydrated in the molecule or between the molecules, the interaction due to a hydrogen bond or the like is strengthened, and the main chain which is a polymer contracts. It has been found that there is a positive correlation in which as the amount of the CMC to be added in a slurry is increased, the curvature of a current collector (one-side electrode) is increased.

In a case where a flat plate-shaped silicate is used as a thickening agent for a slurry, an electrode with one surface coating is not curved even if the electrode is dried. Although the detailed reason has not been clarified, since the flat plate-shaped silicate is an inorganic material, it is considered that the interaction between particles of the flat plate-shaped silicate is not strengthened even if heat treatment is performed around at a temperature at which a solvent is dried. Since the electrode is not curved, cracks in an active material-containing layer is suppressed and further peeling of the active material-containing layer from a current collector can be suppressed. Therefore, an electrode provided with an active material-containing layer containing a flat plate-shaped silicate has low internal resistance, and can realize a secondary battery that is excellent in the cycle life properties.

The flat plate-shaped silicate contains at least one polyvalent cation selected from the group consisting of Al, Mg and Ca in the crystal structure, and part of the polyvalent cations is preferably substituted by at least one monovalent cation selected from the group consisting of Li and Na. Silicates each having such a crystal structure are also collectively referred to as smectites. Among the smectites, flat plate-shaped smectites and non-flat plate-shaped smectites are present, and the plate-shaped smectites exhibit a thickening action as follows. A flat plate-shaped silicate having the above crystal structure is negatively charged in the crystal structure. Therefore, in order to maintain the electrical neutrality, a cation that can be intercalated in the crystal structure, such as sodium, is adsorbed in the vicinity of the main surface (surface having a large area) in a flat plate shape. As a result, the flat plate has a structure in which the front surface is positively charged and the side surface is negatively charged, and therefore, flat plate-shaped silicates are laminated with each other by an electrostatic action, and an effect that a coating liquid becomes viscous is exerted.

Since the silicate has a flat plate shape, the lamination is easily generated. Therefore, in a case where a flat plate-shaped silicate is used, the thickening action of a slurry is high, and the precipitation of various particles such as active material particles dispersed in the slurry can be suppressed. Therefore, after this slurry is applied on a current collector, various particles are hardly precipitated in the slurry, and a uniform active material-containing layer can be prepared. According to the uniform active material-containing layer having favorable dispersibility of various particles, excellent cycle life properties can be achieved.

In a case where the silicate does not have a flat plate shape, the lamination of silicate due to the above electrostatic action is hardly generated, and therefore, the viscosity of a slurry becomes insufficient when an active material-containing layer is prepared. If a slurry having a low viscosity is applied onto a current collector, various particles such as active material particles that are dispersed in the slurry are precipitated, and a state in which various particles are deposited in the vicinity of a surface of the current collector is provided. Due to this deposition, particles having a similar specific gravity gather together, and therefore, it is difficult to uniformly prepare an active material-containing layer. If a nonuniform active material-containing layer is used, an area where a conductive path is insufficient is generated in an electrode, or a binder is insufficient at the interface between the current collector foil and the mixture layer, and the peeling is easily generated, and as a result of which the cycle life properties become poor.

The thickness of the flat plate-shaped silicate is, for example, within a range from 0.2 nm to 100 nm, preferably within a range from 0.5 nm to 50 nm, and more preferably within a range from 1.0 nm to 20 nm. If the thickness of the flat plate-shaped silicate is less than 0.2 nm, the tap density tends to decrease and the handling tends to be difficult, and which is not preferable. If the tap density is lowered, the density of the active material-containing layer hardly increases by the pressing during electrode preparation, that is, there is a possibility that the increase of the electrode density becomes difficult. If the thickness of the flat plate-shaped silicate exceeds 100 nm, such a flat plate-shaped silicate covers surfaces of active material particles and the diffusion of Li ions is inhibited, and which is not preferable.

The length of the flat plate-shaped silicate in the longer direction is, for example, within a range from 5 nm to 1000 nm, and preferably within a range from 20 nm to 500 nm.

The length of the flat plate-shaped silicate in the shorter direction is, for example, within a range from 3 nm to 900 nm, and preferably within a range from 10 nm to 300 nm.

The aspect ratio of the length in the shorter direction to the thickness (length in shorter direction/thickness) of the flat plate-shaped silicate is, for example, within a range from 5 to 25. The aspect ratio is preferably within a range from 8 to 20. If the aspect ratio is excessively small, the thickening effect of a slurry tends to be small. If the aspect ratio is excessively large, the applied surface becomes hard due to the influence from a long silicate, thereby winding becomes difficult during coating. That is, the active material-containing layer is easily broken after coating, or is easily peeled off from a current collector, and which is not preferable. A silicate having an aspect ratio of 2 or more is regarded as a flat plate-shaped silicate. In a case where a non-flat plate-shaped silicate is used, the viscosity of a slurry of an active material-containing layer is insufficient, and the distribution state of particles in an active material-containing layer to be formed is not uniform, and therefore, the cycle life properties are poor.

The shape of the main surface of a flat plate-shaped silicate is not particularly limited, and for example, may be a substantially circular shape or an elliptical shape.

The thickness, length in the longer direction, length in the shorter direction, and aspect ratio of a flat plate-shaped silicate can be determined by the measurement of particle form described below.

<Measurement of Particle Form of Flat Plate-Shaped Silicate>

A particle form of a flat plate-shaped silicate can be measured with, for example, an atomic force microscope (AFM). Note that whether or not an active material-containing layer contains a flat plate-shaped silicate can be determined by performing X-ray powder diffraction (XRD) and high-frequency inductively coupled plasma (ICP) analysis, as described later in a method for measuring a content of a flat plate-shaped silicate.

First, 10 mg of an active material-containing layer is peeled off as sampling from an electrode, pulverized and mixed in a mortar, and then the mixture is impregnated with pure water and irradiated with ultrasonic waves for 30 minutes to obtain a solution. The solution is filtered by using a filter having a pore diameter of 0.2 μm to remove fine particles. Onto a 1 cm$^2$ mica substrate, 5 μL of filtrate is applied, and dried to prepare a sample for AFM. As the AFM analyzer, a Nanoscope III multimode scanning probe microscope manufactured by Digital. Instruments, or an apparatus having a function equivalent to that of the Nanoscope III multimode scanning probe microscope can be used. By performing an analysis with the use of an AFM on the prepared sample, the thickness, length in the longer direction, and length in the shorter direction of a flat plate-shaped silicate can be analyzed. The measurement conditions are a tapping mode with a cantilever oscillation period of 200 Hz to 400 Hz, a step interval of 10 nm, and a measurement area within a range of 2 μm×2 μm. For each of the thickness of particle, the length in the longer direction, and the length in the shorter direction in the measurement range, the average thickness, the average length in the longer direction, and the average length in the shorter direction are calculated by dividing the weighted average by the number average. The above-described thickness, length in the longer direction, and length in the shorter direction of a flat plate-shaped silicate are all values calculated as average values by the analysis.

In a case where mixing of other members is observed in the analysis of the flat plate-shaped silicate, it is preferable to perform an analysis by a scanning spread resistance microscope (SSRM) in which a bias voltage is applied while bringing the cantilever into contact with the sample surface, together with the AFM analysis. A flat plate-shaped silicate has high polarity in the particle, and forms a surface having a relatively low sheet resistance of around $10^6$ to $10^{12}\Omega$. In contrast, a binder resin component such as styrene-butadiene rubber (SBR) shows a high resistance value of $10^{13}\Omega$ or more. Due to the difference in the conductivity, the physical property information of only the silicate except for the mixed SBR and the like can be extracted by performing the SSRM measurement in the same field of view as the AFM.

The specific surface area of the flat plate-shaped silicate is, for example, within a range from 200 g/m² to 1000 g/m².

Examples of the silicate include hectorite ($Na_x(Mg, Li)_3Si_4O_{10}(OH)_2$ ($0<x\leq3$)), saponite ($Ca/2, Na)_x(Mg, Fe)_3(Si, Al)_4O_{10}(OH)_2 \cdot 4H_2O$ ($0<x\leq3$)), and montmorillonite ($Ca/2, Na)_y(Al, Mg)_2(Si_4)O_{10}(OH)2nH_2O$ ($0<y\leq2$)). Among silicates, as the silicate according to the embodiment, a silicate having a flat plate shape is used.

In an active material-containing layer, the ratio of a mass of the flat plate-shaped silicate to a mass of the active material is, for example, within a range from 0.01 to 0.1, and preferably within a range from 0.01 to 0.05. If the content of the flat plate-shaped silicate is excessively small, the viscosity of a slurry during electrode preparation is insufficient. Therefore, the distribution of various components in the active material-containing layer to be obtained becomes nonuniform, and as a result of which the cycle life properties becomes poor. If the content of the flat plate-shaped silicate is excessively large, the diffusion of Li and electrons is inhibited. Therefore, there is a disadvantage of having a factor causing the increase of resistance.

<Measurement of Content of Flat Plate-Shaped Silicate in Active Material-Containing Layer>

An active material-containing layer is peeled off from an electrode, dissolved in pure water and irradiated with ultrasonic waves. The solution is filtered by using a filter having a pore diameter of 0.2 μm to remove fine particles. The obtained solution is dried at 120° C., and a solvent is removed to obtain powder. By subjecting the powder to a qualitative analysis by X-ray powder diffraction (XRD) analysis and further to a composition analysis by high-frequency inductively coupled plasma (ICP) analysis, the content of the flat plate-shaped silicate contained in the powder can be calculated. At this time, although a water-soluble component such as CMC may be contained, the mass ratio between the flat plate-shaped silicate and the other components can be calculated from the analysis results of ICP. The content of the flat plate-shaped silicate can be measured from the ratio of the mass of the flat plate-shaped silicate in the finally obtained powder to the mass of the active material-containing layer peeled off from the electrode.

Hereinafter, the electrode according to the embodiment will be described in detail.

The electrode according to the embodiment can include a current collector and an active material-containing layer. The active material-containing layer can be formed on one or both sides of the current collector. The active material-containing layer can include active material particles, and optionally a conductive agent and a binder. The electrode according to the embodiment may be a negative electrode or a positive electrode. The electrode according to the embodiment is, for example, an electrode for a battery, or an electrode for a secondary battery.

The active material contains at least one selected from the group consisting of a carbon material, silicon, a silicon oxide, and a titanium composite oxide.

Examples of the carbon material include artificial graphite, natural graphite, and spindle-shaped graphite obtained by consolidating natural graphite and covering the consolidated natural graphite with carbon.

Examples of the titanium composite oxide include lithium titanate having a ramsdellite structure (for example, $Li_{2+y}Ti_3O_7$, $0\leq y\leq3$), lithium titanate having a spinel structure (for example, $Li_{4+x}Ti_5O_{12}$, $0\leq x\leq3$), monoclinic titanium dioxide ($TiO_2$), anatase titanium dioxide, rutile titanium dioxide, a hollandite titanium composite oxide, an orthorhombic titanium composite oxide, and a monoclinic niobium titanium composite oxide.

The active material-containing layer may contain only a monoclinic niobium titanium composite oxide as the active material.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni, and Al. Each subscript in the composition formulas is given such that $0\leq a\leq6$, $0\leq b<2$, $0\leq c<6$, $0\leq d<6$, and $-0.5\leq\sigma\leq0.5$. A specific example of the orthorhombic titanium-containing composite oxide is $Li_{2+a}Na_2Ti_6O_{14}$ ($0\leq a\leq6$).

Examples of the monoclinic niobium-titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0\leq x\leq5$, $0\leq y<1$, $0\leq z<2$, and $-0.3\leq\delta\leq0.3$. A specific example of the monoclinic niobium titanium composite oxide is $Li_xNb_2TiO_7$ ($0\leq x\leq5$).

Another example of the monoclinic niobium titanium composite oxide include a compound represented by $Li_xTi_{1-y}M3_{y+z}Nb_{2-z}O_{7-\delta}$. In this regard, M3 is at least one selected from the group consisting of Mg, Fe, Ni, Co, W, Ta, and Mo. The respective subscripts in the composition formula are specified as follows: $0\leq x<5$, $0\leq y<1$, $0\leq z<2$, and $-0.3\leq\delta\leq0.3$.

Specific examples of the monoclinic niobium titanium composite oxide include $Nb_2TiO_7$, $Nb_2Ti_2O_9$, $Nb_{10}Ti_2O_{29}$, $Nb_{14}TiO_{37}$, and $Nb_{24}TiO_{62}$. The monoclinic niobium titanium composite oxide may be a substituted niobium titanium composite oxide in which at least part of Nb and/or Ti is substituted by a dopant. Examples of the substitution element include Na, K, Ca, Co, Ni, Si, P, V, Cr, Mo, Ta, Zr, Mn, Fe, Mg, B, Pb, and Al. The substituted niobium titanium composite oxide may contain one kind of substitution element or may contain two or more kinds of substitution elements.

A conductive agent is added in order to increase the current-collecting performance and further to suppress the contact resistance between the active material and the current collector. Examples of the conductive agent include vapor grown carbon fiber (VGCF), carbon black such as acetylene black, and a carbonaceous matter such as graphite. One of these materials may be used as the conductive agent, or two or more of these materials may be combined and used as the conductive agent. Alternatively, in place of using the conductive agent, carbon coating or electron conductive inorganic material coating may be performed on surfaces of the active material particles.

A binder is added in order to fill a gap between dispersed active materials and to bind the active materials and a negative electrode current collector. Examples of the binder include polytetrafluoroethylene (PTFE), polyvinylidene fluoride (PVdF), fluorine rubber, styrene-butadiene rubber, ethylene-propylene rubber, a polyacrylic acid compound, polyamide, and an imide compound. One of these materials may be used as the binder, or two or more of these materials may be combined and used as the binder.

The active material-containing layer may further contain a dispersing agent. A flat plate-shaped silicate has a zeta potential in the vicinity of 0 mV in a slurry (water solvent) for forming an active material-containing layer. Therefore, in a case where a carbon material is used as a conductive agent, the dispersibility of the carbon material may be lowered in some cases. When the active material-containing layer contains a dispersing agent, the conductive agent can be dispersed well, and therefore, an excellent conductive path can be formed through the carbon material in an electrode. The kind of dispersing agent is not particularly limited as long as it does not affect the charging/discharging of a secondary battery. Examples of the dispersing agent include a water-soluble material having anionicity and cat-ionicity can be used.

The active material-containing layer contains a flat plate-shaped silicate as a thickening agent. The active material-containing layer may further contain another thickening agent such as CMC, however, it is preferable that the active material-containing layer does not contain the CMC. In a case where the active material-containing layer contains another thickening agent, the proportion of the flat plate-shaped silicate in the thickening agent is preferably 50% by mass or more, and more preferably 80% by mass or more.

The blending ratio of the active material particles, the conductive agent, the binder, and the thickening agent in the active material-containing layer can be changed appropriately according to the use of the electrode, and the blending ratio is, for example, as follows. The active material-containing layer preferably contains the active material particles, the conductive agent, the binder, and the thickening agent at ratios in a range from 70% by mass to 96% by mass or less, in a range from 2% by mass to 28% by mass, in a range from 2% by mass to 28% by mass, and in a range from 2% by mass to 28% by mass, respectively. By setting the amount of the conductive agent to be 2% by mass or more, the current-collecting performance of the active material-containing layer can be improved. Further, by setting the amount of the binder to be 2% by mass or more, the binding between the active material-containing layer and the current collector becomes sufficient, and excellent cycle performance can be expected. On the other hand, it is preferable to set each of the conductive agent, the binder, and the thickening agent to be 28% by mass or less to attain the higher capacity. With regard to the dispersing agent, it is effective to add the dispersing agent with the intention of stabilizing the dispersion of the conductive agent, and it is preferable to add the dispersing agent in an amount in a range from 10% to 100% with respect to the amount of the conductive agent. In a case where the amount of the dispersing agent is larger than 100%, there is a concern that the dispersing agent may become a resistance component, and if the amount of the dispersing agent is less than 10%, a sufficient dispersion effect may not be obtained.

The current collector is made of a material that is electrochemically stable at potentials at which allowing lithium (Li) to be inserted into and extracted from the active material. Each of the potentials at which lithium (Li) is inserted into and extracted from the active material is, for example, a potential nobler than 1.0 V. For example, in a case where the electrode according to the embodiment functions as a negative electrode, the current collector is preferably made of copper, nickel, stainless steel or aluminum, or an aluminum alloy containing one or more elements selected from Mg, Ti, Zn, Mn, Fe, Cu, and Si. The current collector preferably has a thickness in a range from 5 µm to 20 µm. The current collector having such a thickness can achieve the balance between the strength of the electrode and the weight reduction.

In a case where aluminum or an aluminum alloy is used as the current collector, since a one-side electrode tends to warp, the effect of improving the cycle life properties by being provided with the active material-containing layer according to the embodiment can be more favorably exerted.

Note that the current collector may contain a part where an active material-containing layer is not formed on the surface of the current collector. This part can work as a current collector tab.

The active material-containing layer preferably has a density (excluding the current collector) within a range from 2.4 g/cm$^3$ to 3.0 g/cm$^3$. The density of the active material-containing layer can also be referred to as electrode density. If the electrode density is within the range, the active material particles and the conductive agent are adequately in close contact with each other, and as result of which the balance between the formation of an electron conductive path in the electrode and the permeability of an electrolyte solution is favorable, and quick charge/discharge performance and life performance are improved.

<Production Method of Electrode>

An electrode can be produced, for example, according to the following method. First, a slurry is prepared by suspending an active material, a conductive agent, a binder, and a flat plate-shaped silicate as a thickening agent in a water solvent. A dispersing agent may be further added to the slurry. The slurry is applied onto one or both sides of a current collector. The applied slurry is dried to obtain a laminate of the active material-containing layer and the current collector. After that, the laminate was pressed. In this way, an electrode is prepared.

Since the slurry according to the embodiment contains a flat plate-shaped silicate, even if a coating film is dried after being applied onto a current collector, the curving of the electrode is suppressed.

When the electrode is produced by a mass production process, for example, by the multiple-zone coating illustrated in FIG. 1, multiple electrodes each having strip shape can be continuously produced. FIG. 1 is a perspective view schematically showing an example of a step of preparing electrodes. FIG. 1 illustrates a state in which three lines of the slurries for active material-containing layers, 50$a$, 50$b$, and 50$c$ are applied to be a strip shape onto a sheet-shaped current collector 3$a$. In this state, the current collector 3$a$ is cut into three pieces at the positions of lines C indicating the cutting positions. In this way, three sheets of current collectors with the coating films coated with slurries are prepared on one side of the current collector 3$a$.

A coating film is applied up to the vicinity of each of the cut surfaces of the current collector 3$a$. In a case where a slurry does not contain a flat plate-shaped silicate, the slurry contains another thickening agent, for example, CMC or the like. Therefore, by drying the coating film, curving of a current collector and a coating film is generated in the vicinity of each of the cut surfaces. As a result, the productivity of the electrode is significantly reduced. For example, when an active material-containing layer is formed on one side of a current collector to prepare a one-side electrode, and then a slurry is applied onto a surface on the other side of the current collector, if the current collector is warped, it is difficult to uniformly apply the slurry.

On the other hand, in a case where a slurry contains a flat plate-shaped silicate, generation of the curving of a current collector and a coating film can be suppressed even in the vicinity of the cut surface. Therefore, if a slurry for forming an active material-containing layer contains a flat plate-shaped silicate, an electrode can be prepared with high productivity, and further cracks of the active material-containing layer can be suppressed due to the suppression of the curving of the electrode, even in a mass production process of multiple-zone coating or the like. Alternatively, peeling of the active material-containing layer from a current collector can be suppressed. As a result, the electrode according to the embodiment can achieve excellent cycle life properties.

According to the first embodiment, an electrode is provided. The electrode includes an active material-containing layer containing an active material and a flat plate-shaped silicate.

Therefore, with the electrode according to the first embodiment, a secondary battery having excellent cycle life properties can be realized.

Second Embodiment

According to the second embodiment, a secondary battery including a negative electrode, a positive electrode, and an electrolyte is provided. The secondary battery includes the electrode according to the first embodiment as the negative electrode.

The secondary battery additionally can be equipped with a separator disposed between the positive electrode and the negative electrode. The negative electrode, the positive electrode, and the separator can constitute an electrode group. The electrolyte can be held in the electrode group.

The secondary battery additionally can be equipped with a container member that houses the electrode group and the electrolyte.

Furthermore, the secondary battery additionally can be equipped with a negative electrode terminal electrically connected to the negative electrode and a positive electrode terminal electrically connected to the positive electrode.

The secondary battery can be, for example, a lithium secondary battery. The secondary battery may be a nonaqueous electrolyte secondary battery including a nonaqueous electrolyte.

Hereinafter, the negative electrode, the positive electrode, the electrolyte, the separator, the container member, the negative electrode terminal, and the positive electrode terminal will be described in detail.

(1) Negative Electrode

The negative electrode provided in the secondary battery according to the second embodiment may be, for example, the electrode described in the first embodiment. The active material-containing layer included in the electrode may be a negative electrode active material-containing layer. The active material particles included in the electrode may be negative electrode active material particles. On the negative electrode active material-containing layer, a polymer fiber layer to be described later may be laminated. The negative electrode on which a polymer fiber layer is laminated may be a negative electrode structural body.

The negative electrode can be produced, for example, by a method similar to that for the electrode according to the first embodiment.

(2) Positive Electrode

The positive electrode can include a positive electrode current collector and a positive electrode active material-containing layer. The positive electrode active material-containing layer can be formed on one side or both sides of the positive electrode current collector. The positive electrode active material-containing layer can contain a positive electrode active material, and optionally a conductive agent and a binder. A polymer fiber layer, which will be described later, can be laminated on the positive electrode active material-containing layer. The positive electrode on which the polymer fiber layer is laminated may be a positive electrode structure.

Examples of the positive electrode active material include oxides and sulfides. The positive electrode may include, as the positive electrode active material, one type of compound or two or more different types of compounds. Examples of the oxides and the sulfides may include compounds allowing lithium or lithium ions to be inserted thereinto or extracted therefrom.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material may preferably have primary particle sizes in the range of 100 nm to 1 μm. The positive electrode active material having primary particle sizes of 100 nm or more may be easy to handle in industrial applications. The positive electrode active material having primary particle sizes of 1 μm or less may allow lithium ions to be smoothly diffused in solid.

The positive electrode active material may preferably have a specific surface area in the range of 0.1 m²/g to 10 m²/g. The positive electrode active material having a specific surface area of 0.1 m²/g or more may secure an adequately large site for insertion and extraction of Li ions. The positive electrode active material having a specific surface area of 10 m²/g or less may be easy to handle in industrial applications and may ensure a favorable charge-and-discharge cycle.

The binder is blended in order to fill a gap between the dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compounds, and imide compounds. One of these may be used as the binder, or a combination of two or more thereof may be used as the binder.

A conductive agent is added in order to increase the current-collecting performance and suppress the contact resistance between the positive electrode active material and the positive electrode current collector. Examples of the conductive agent include carbonaceous matters such as vapor grown carbon fiber (VGCF) and carbon black. Examples of the carbon black include acetylene black and graphite. One of these materials may be used as the conductive agent, or two or more of these materials may be combined and used as the conductive agent. In addition, the conductive agent can be omitted.

In the positive electrode active material-containing layer, it is preferable to combine the positive electrode active material and the binder in a mass ratio of the positive electrode active material in a range from 80% to 98% and the binder in a range from 2% to 20%.

By making the amount of the binder be 2% by mass or greater, sufficient electrode strength is obtained. In addition, the binder may function as an insulator. For this reason, if the amount of the binder is kept at 20% by mass or less, the amount of insulation contained in the electrode is decreased, and therefore the internal resistance can be reduced.

In the case of adding the conductive agent, it is preferable to combine the positive electrode active material, the binder, and the conductive agent in a mass ratio of the positive electrode active material in a range from 77% to 95%, the binder in a range from 2% to 20%, and conductive agent in a range from 3% to 15%.

By making the amount of the conductive agent be 3% by mass or greater, the effects described above can be exhibited. Also, by keeping the amount of the conductive agent to 15% by mass or less, the proportion of the conductive agent in contact with electrolyte can be lowered. If this proportion is low, decomposition of the electrolyte under high-temperature storage can be reduced.

The positive electrode current collector is preferably an aluminum foil or an aluminum alloy foil containing one or more elements selected from Mg, Ti, Zn, Ni, Cr, Mn, Fe, Cu, and Si.

The thickness of the aluminum foil or aluminum alloy foil is preferably within a range from 5 μm to 20 μm, and is more preferably 15 μm or less. The purity of the aluminum foil is preferably 99% by mass or more. The content of transition metals such as iron, copper, nickel, and chromium contained in the aluminum foil or aluminum alloy foil is preferably 1% by mass or less.

In addition, the positive electrode current collector can include a portion where the positive electrode active material-containing layer is not formed on the surface thereof. This portion can serve as a positive electrode tab.

The positive electrode can be produced, for example, by the following method. First, an active material, a conductive agent, and a binder are suspended in a solvent to prepare a slurry. This slurry is applied to one side or both sides of the current collector. Next, the applied slurry is dried to obtain a laminate of the active material-containing layer and the current collector. Thereafter, the laminate is pressed. The positive electrode is thus produced.

Alternatively, the positive electrode may be produced by the following method. First, an active material, a conductive agent, and a binder are mixed to obtain a mixture. The mixture is then formed into pellets. Subsequently, these pellets can be arranged on the current collector to obtain a positive electrode.

(3) Electrolyte

Examples of the electrolyte may include nonaqueous liquid electrolyte or nonaqueous gel electrolyte. The nonaqueous liquid electrolyte may be prepared by dissolving an electrolyte salt used as solute in an organic solvent. The electrolyte salt may preferably have a concentration in the range of 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVDF), polyacrylonitrile (PAN), polyethylene oxide (PEO), and mixtures thereof.

Alternatively, besides the nonaqueous liquid electrolyte and the nonaqueous gel electrolyte, a room-temperature molten salt (ionic melt) containing lithium ions, a polymer solid electrolyte, an inorganic solid electrolyte, and the like may also be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

A polymer solid electrolyte is prepared by dissolving an electrolyte salt into a polymer material and solidifying the result.

An inorganic solid electrolyte is solid material having Li-ion conductivity.

The electrolyte may also be an aqueous electrolyte containing water.

The aqueous electrolyte includes an aqueous solvent and an electrolyte salt. The aqueous electrolyte is liquid, for example. A liquid aqueous electrolyte is an aqueous solution prepared by dissolving an electrolyte salt as the solute in an aqueous solvent. The aqueous solvent is a solvent containing 50% or more water by volume, for example. The aqueous solvent may also be pure water.

The aqueous electrolyte may also be an aqueous gel composite electrolyte containing an aqueous electrolytic solution and a polymer material. The polymer material may be, for example, polyvinylidene fluoride (PVDF), polyacrylonitrile (PAN), or polyethylene oxide (PEO).

The aqueous electrolyte preferably contains 1 mol or greater of aqueous solvent per 1 mol of the salt as the solute. In an even more preferably aspect, the aqueous electrolyte contains 3.5 mol or greater of aqueous solvent per 1 mol of the salt as the solute.

That the aqueous electrolyte contains water can be confirmed by gas chromatography-mass spectrometry (GC-MS) measurement. Also, the salt concentration and the amount of water contained in the aqueous electrolyte can be computed by measurement using inductively coupled plasma (ICP) emission spectroscopy or the like, for example. By measuring out a prescribed amount of the aqueous electrolyte and computing the contained salt concentration, the molar concentration (mol/L) can be computed. Also, by measuring the specific gravity of the aqueous electrolyte, the number of moles of the solute and the solvent can be computed.

The aqueous electrolyte is prepared by dissolving the electrolyte salt into the aqueous solvent at a concentration from 1 to 12 mol/L for example.

To suppress electrolysis of the aqueous electrolyte, LiOH, $Li_2SO_4$, or the like can be added to adjust the pH. The pH is preferably from 3 to 13, and more preferably from 4 to 12.

(4) Separator

The separator is formed of, for example, a porous film containing polyethylene (polyethylene; PE), polypropylene (polypropylene; PP), cellulose, or polyvinylidene fluoride (PVdF), or a synthetic resin nonwoven fabric. From the viewpoint of safety, it is preferable to use a porous film formed from polyethylene or polypropylene. This is because these porous films can be melted at a predetermined temperature to interrupt the current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped.

The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. $Li/Li^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the embodiment will be described in detail with reference to the drawings.

Figure 2:
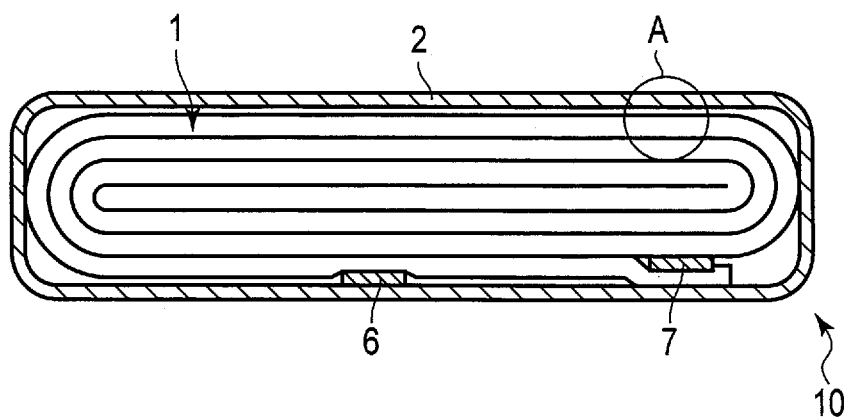
FIG. 2 is a cross-sectional view schematically illustrating one example of a secondary battery according to an embodiment.

FIG. 2 is a sectional view schematically showing one example of a secondary battery according to an embodiment. FIG. 3 is an enlarged sectional view of a portion A of the secondary battery shown in FIG. 2.

The secondary battery 100 shown in FIG. 2 and FIG. 3 includes a bag-shaped container member 2 shown in FIG. 2, an electrode group 1 shown in FIG. 2 and FIG. 3, and an electrolyte (not shown). The electrode group 1 and the electrolyte are stored in the bag-shaped container member 2. The electrolyte (not shown) is held in the electrode group 1.

The bag-shaped container member 2 is formed from a laminate film including two resin layers and a metal layer disposed therebetween.

As shown in FIG. 2, the electrode group 1 is a flat wound electrode group. The flat wound electrode group 1 includes negative electrodes 3, separators 4, and positive electrodes 5 as shown in FIG. 3. The separator 4 is disposed between the negative electrode 3 and the positive electrode 5.

A negative electrode 3 includes a negative electrode current collector 3a and negative electrode active material-containing layers 3b. In the portion of the negative electrode 3 located at the outermost shell of a wound electrode group 1, the negative electrode active material-containing layer 3b is formed only on the inside surface side of the negative electrode current collector 3a, as shown in FIG. 3. In another portion of the negative electrode 3, the negative electrode active material-containing layer 3b is formed on both sides of the negative electrode current collector 3a.

A positive electrode 5 includes a positive electrode current collector 5a and a positive electrode active material-containing layer 5b formed on both sides thereof.

As shown in FIG. 2, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the opening of the bag-shaped container member 2 are closed by thermal fusion bonding of the thermoplastic resin layer.

The secondary battery according to the embodiment is not limited to the secondary battery having the structure shown in FIGS. 2 and 3, and may be, for example, a battery having a structure shown in FIGS. 4 and 5.

FIG. 4 is a partial cut-away sectional perspective view schematically showing another example of the secondary battery according to the embodiment. FIG. 5 is an enlarged sectional view of a portion B of the secondary battery shown in FIG. 4.

The secondary battery 100 shown in FIGS. 4 and 5 includes an electrode group 1 shown in FIGS. 4 and 5, a container member 2 shown in FIG. 4, and an electrolyte (not shown). The electrode group 1 and the electrolyte are stored in the container member 2. The electrolyte is held in the electrode group 1.

The container member 2 is made of a laminate film including two resin layers and a metal layer intervening therebetween.

As shown in FIG. 5, the electrode group 1 is a laminated electrode group. The laminated electrode group 1 has a structure in which a negative electrode 3 and a positive electrode 5 are alternately laminated with a separator 4 intervening therebetween.

The electrode group 1 includes a plurality of the negative electrodes 3. The plurality of negative electrodes 3 are each provided with a negative electrode current collector 3a and a negative electrode active material-containing layer 3b carried on both sides of the negative electrode current collector 3a. Further, the electrode group 1 includes a plurality of the positive electrodes 5. The plurality of positive electrodes 5 are each provided with a positive electrode current collector 5a and a positive electrode active material-containing layer 5b carried on both sides of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode tab. As shown in FIG. 5, the portion 3c acting as the negative electrode tab does not overlap the positive electrode 5. In addition, a plurality of negative electrode tabs (portion 3c) is electrically connected to a belt-shaped negative electrode terminal 6. A tip of the belt-shaped negative electrode terminal 6 is drawn outward from a container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to a belt-shaped positive electrode terminal 7. A tip of the belt-shaped positive electrode terminal 7 is positioned on the opposite side to the negative electrode terminal 6 and is drawn outward from the container member 2.

The secondary battery according to the second embodiment includes the electrode according to the first embodiment. Therefore, the secondary battery according to the second embodiment can achieve excellent cycle life properties.

Third Embodiment

According to the third embodiment, a battery module is provided. The battery module according to the third embodiment is equipped with a plurality of the secondary batteries according to the second embodiment.

In the battery module according to the embodiment, individual unit cells may be electrically connected in series or in parallel, or may be arranged in combination of series connection and parallel connection.

Next, an example of the battery module according to the embodiment will be described with reference to the drawings.

FIG. 6 is a perspective view schematically showing an example of the battery module according to the embodiment. The battery module 200 shown in FIG. 6 includes five unit cells 100a to 100e, four bus bars 21, a positive electrode-side lead 22, and a negative electrode-side lead 23. Each of the five unit cells 100a to 100e is the secondary battery according to the second embodiment.

The busbar 21 connects a negative electrode terminal 6 of a single unit cell 100a to a positive electrode terminal 7 of an adjacently positioned unit cell 100b. In this way, the five unit cells 100a to 100e are connected in series by the four bus bars 21. That is, the battery module 200 shown in FIG. 6 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

The battery module according to the third embodiment includes the secondary battery according to the second embodiment. Therefore, the battery module according to the third embodiment can achieve excellent cycle life properties.

Fourth Embodiment

According to the fourth embodiment, a battery pack is provided. The battery pack includes the battery module according to the third embodiment. The battery pack may also be equipped with a single secondary battery according to the second embodiment instead of the battery module according to the third embodiment.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 7:
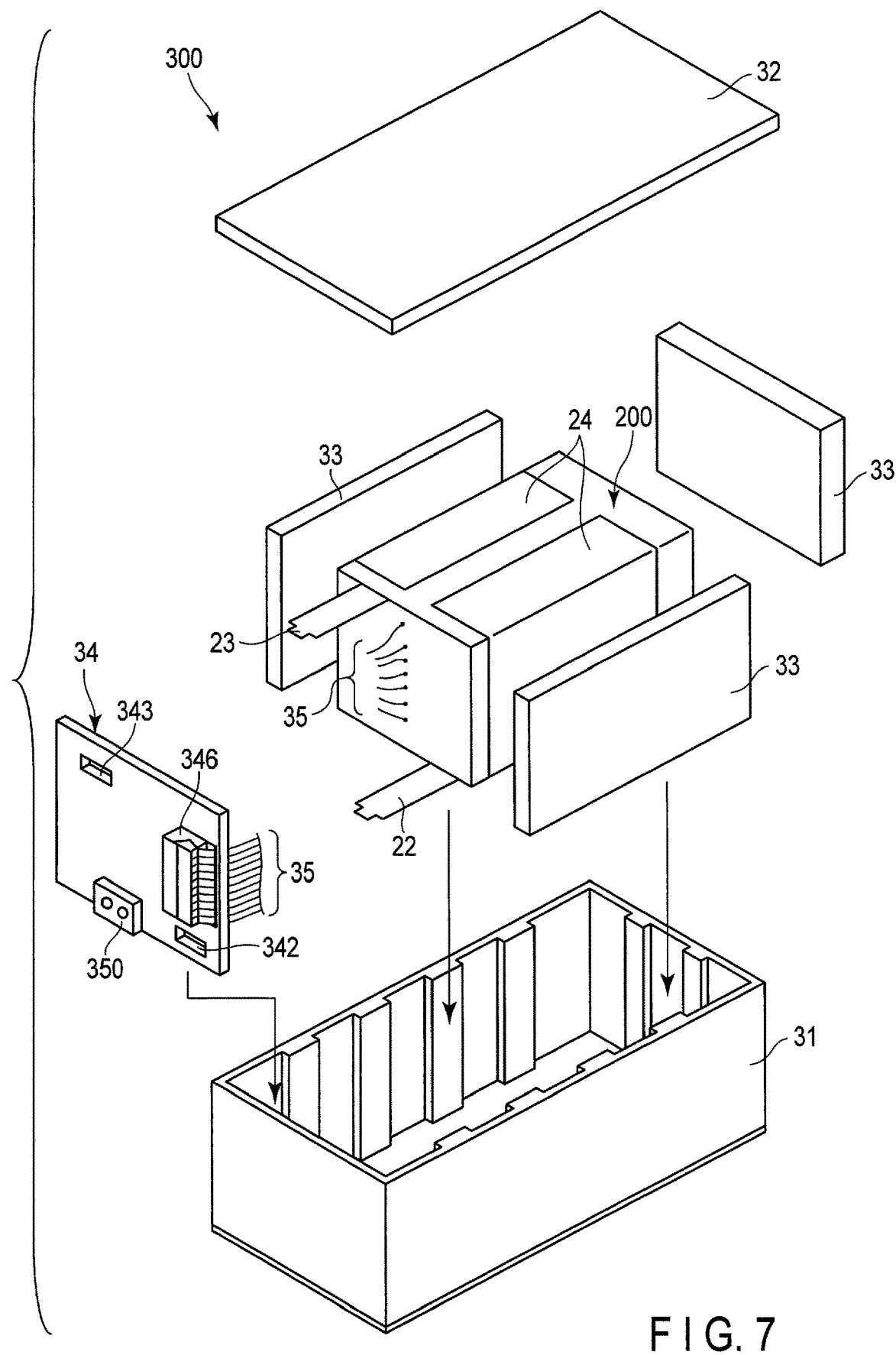
FIG. 7 is an exploded perspective view schematically illustrating one example of a battery pack according to an embodiment.

FIG. 7 is an exploded perspective view schematically showing an example of the battery pack according to the embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

A housing container 31 shown in FIG. 7 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 8. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342. The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343a. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fourth embodiment includes the secondary battery according to the second embodiment or the battery module according to the third embodiment. Therefore, according to the fourth embodiment, it is possible to provide a battery pack provided with a secondary battery or a battery module, which can realize excellent cycle life properties.

Fifth Embodiment

According to the fifth embodiment, a vehicle is provided. The vehicle includes the battery pack according to the fourth embodiment.

In a vehicle according to the fifth embodiment, the battery pack is configured, for example, to recover regenerative energy from motive force of the vehicle. The vehicle may include a mechanism configured to convert kinetic energy of the vehicle into regenerative energy.

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

A plurality of battery packs is loaded on the vehicle according to the fifth embodiment. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the fifth embodiment will be described with reference to the drawings.

FIG. 9 is a partially transparent diagram schematically illustrating one example of a vehicle according to the embodiment.

A vehicle 400 illustrated in FIG. 9 includes a vehicle body 40 and a battery pack 300 according to the embodiment. In the example illustrated in FIG. 9, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 9, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the fifth embodiment will be described with reference to FIG. 10.

Figure 10:
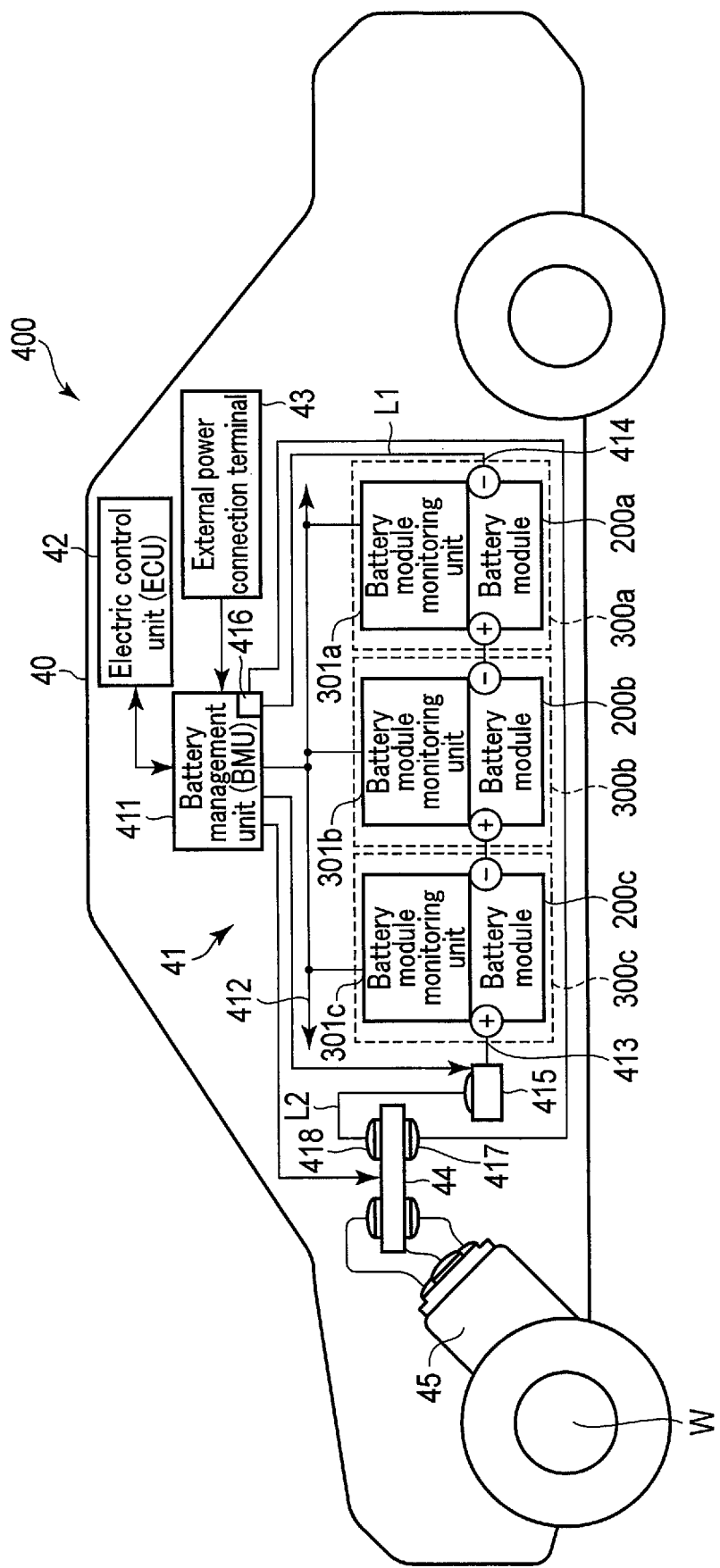
FIG. 10 is a diagram schematically illustrating one example of a control system related to an electrical system in the vehicle according to the embodiment.

FIG. 10 is a diagram schematically illustrating one example of a control system related to an electrical system in the vehicle according to the fifth embodiment. The vehicle 400 illustrated in FIG. 10 is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 10) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

The vehicle according to the fifth embodiment includes the battery pack according to the fourth embodiment. Therefore, according to the fifth embodiment, it is possible to provide a vehicle provided with a battery pack, which can realize excellent cycle life properties.

EXAMPLES

Although Examples will be described hereinafter, the embodiments are not limited to Examples to be described hereinafter.

Example 1

<Preparation of Negative Electrode>

100 parts by mass of $Li_4Ti_5O_{12}$ as negative electrode active material powder, 10 parts by mass of acetylene black, 5 parts by mass of hectorite ($Na_{0.6}Mg_{5.6}Li_8O_{20}(OH)_4$) as a flat plate-shaped silicate, and 5 parts by mass of a styrene butadiene copolymer (SBR) were prepared, and these materials were mixed in pure water to prepare a slurry. The prepared slurry was applied with a width of 10 cm at an applying amount of 100 g/m$^2$ onto a surface on one side of a negative electrode current collector made of an aluminum foil having a thickness of 15 μm, a length of 10 cm, and a width of 12 cm, such that unapplied parts each with a width of 1 cm were provided at both ends in the width direction of the negative electrode current collector. Any unapplied part was not provided in the length direction of the negative electrode current collector.

The aluminum foil coated with the slurry was left to stand on a hot plate at 80° C. to dry the slurry, then heights of curving at both ends of the aluminum foil were measured after 5 minutes. Note that both ends mean both end parts in the width direction of the aluminum foil. The height of curving means the height from a surface of the hot plate to the end part of the aluminum foil. At this time, the average value of the heights of two points measured at both ends was defined as the height of curving. Further, the electrode after drying was pressed at a pressing pressure at which a load of 19 tons was applied to the applied part, and thus the electrode having an active material-containing layer formed on one side of the electrode was obtained.

<Analysis of Particle Form of Flat Plate-Shaped Silicate>

When the obtained electrode was subjected to the measurement of particle form of a flat plate-shaped silicate in accordance with the method described in the first embodiment, the flat plate-shaped silicate had a thickness of 10 nm, a length of 100 nm in the longer direction, and a length of 80 nm in the shorter direction. Therefore, the aspect ratio of the length in the shorter direction to the thickness was 8.0. The results are shown in the following Table 1.

<Measurement of Peeled Area Ratio of One-Side Electrode> the applied part of the electrode was cut out into a piece of a 5 cm square, and the 5 cm square piece was left to stand on a workbench, and the applied surface was photographed from directly above by using a digital camera. For the obtained image, the area ratio of the part where the coating was peeled off was measured by using image analysis software. Specifically, by utilizing the fact that the luminance was different between the part where the active material-containing layer was present and the part where aluminum foil was exposed by peeled off the active material-containing layer, at first, a histogram of the number of pixels to the luminance was created from the image. The histogram has a peak indicating the luminance of a part where the active material-containing layer was present and a peak indicating the luminance of the part where the aluminum foil was exposed. The image was binarized with the middle value between these peaks as a threshold value. For the binarized image, the ratio of the area of a part where the aluminum foil was exposed to the area of a part where the active material-containing layer was not peeled off was calculated in percentage. The results are shown in the following Table 1.

<Preparation Method of Secondary Battery>

The previously prepared electrode was punched out into a piece having a diameter of 14 mm, and the piece was vacuum dried for 12 hours in an environment of 80° C. The dried electrode, a glass filter, and a metal Li having a diameter of 15 mm as a counter electrode were laminated to obtain a laminate. As an electrolyte solution, $LiPF_6$ in a concentration of 1.2 M (mol/L) was dissolved in a mixed solvent in which ethylene carbonate and diethyl carbonate had been mixed at a volume ratio of 1:2, to prepare a nonaqueous electrolyte. By using the obtained laminate and nonaqueous electrolyte, a 2032-type coin cell was prepared.

<Evaluation of Capacity Retention Ratio>

The prepared coin cell was repeated 50 cycles of charging and discharging at a current value of 1-hour rate in a voltage range of 3.0 V to 1.4 V under the environment of 25° C. One cycle was set to perform the charging once and the discharging once. The capacity retention ratio was calculated by dividing the discharge capacity after 50 cycles by the initial discharge capacity and then multiplying by 100. The capacity retention ratio serves as an indicator for evaluating the cycle life properties. The results are shown in the following Table 1.

Example 2

An electrode and a coin cell were prepared in the same manner as in Example 1 except that hectorite $(Na_{0.6}Mg_{5.6}Li_{0.4}Si_8O_{20}(OH)_4)$ having a thickness of 2.0 nm, a length of 62 nm in the longer direction, and a length of 35 nm in the shorter direction was used as the flat plate-shaped silicate.

Example 3

An electrode and a coin cell were prepared in the same manner as in Example 1 except that hectorite $(Na_{0.6}Mg_{5.6}Li_{0.4}Si_8O_{20}(OH)_4)$ having a thickness of 1.2 nm, a length of 38 nm in the longer direction, and a length of 18 nm in the shorter direction was used as the flat plate-shaped silicate.

Example 4

An electrode and a coin cell were prepared in the same manner as in Example 1 except that $TiNb_2O_7$ was used as the negative electrode active material, and hectorite $(Na_{0.7}Mg_{5.45}Li_{0.4}Si_8O_{20}(OH)_4)$ having a thickness of 2.0 nm, a length of 62 nm in the longer direction, and a length of 35 nm in the shorter direction was used as the flat plate-shaped silicate.

Example 5

An electrode and a coin cell were prepared in the same manner as in Example 4 except that hectorite $(Na_{0.7}Mg_{5.45}Li_{0.4}Si_8O_{20}(OH)_4)$ having a thickness of 1.0 nm, a length of 35 nm in the longer direction, and a length of 18 nm in the shorter direction was used as the flat plate-shaped silicate.

Example 6

An electrode and a coin cell were prepared in the same manner as in Example 5 except that a cationic aliphatic amine salt as the dispersing agent was added into the slurry at a ratio of 2 parts by mass with respect to 100 parts by mass of the active material, during preparation of the electrode.

Example 7

An electrode and a coin cell were prepared in the same manner as in Example 4 except that hectorite $(Na_{0.7}Mg_{5.45}Li_{0.4}Si_8O_{20}(OH)_4)$ having a thickness of 100 nm, a length of 1000 nm in the longer direction, and a length of 900 nm in the shorter direction was used as the flat plate-shaped silicate.

Example 8

An electrode and a coin cell were prepared in the same manner as in Example 4, except that hectorite $(Na_{0.7}Mg_{5.45}Li_{0.4}Si_8O_{20}(OH)_4)$ having a thickness of 0.2 nm, a length of 5 nm in the longer direction, and a length of 4 nm in the shorter direction was used as the flat plate-shaped silicate.

Example 9

An electrode and a coin cell were prepared in the same manner as in Example 1 except that natural graphite was used as the negative electrode active material, and in the evaluation of capacity retention ratio, the voltage range during charging and discharging was set to be 3.0 V to 0.05 V.

Example 10

An electrode and a coin cell were prepared in the same manner as in Example 5 except that the amount of the flat plate-shaped silicate to be added as the thickening agent was changed to 1 part by mass.

Example 11

An electrode and a coin cell were prepared in the same manner as in Example 5 except that the amount of the flat plate-shaped silicate to be added as the thickening agent was changed to 2 part by mass.

Comparative Example 1

An electrode and a coin cell were prepared in the same manner as in Example 1 except that carboxymethyl cellulose (CMC) was used in place of the flat plate-shaped silicate as the thickening agent.

Comparative Example 2

An electrode and a coin cell were prepared in the same manner as in Example 4 except that carboxymethyl cellulose (CMC) was used in place of the flat plate-shaped silicate as the thickening agent.

Comparative Example 3

An electrode and a coin cell were prepared in the same manner as in Example 9 except that carboxymethyl cellulose (CMC) was used in place of the flat plate-shaped silicate as the thickening agent.

Comparative Example 4

An electrode and a coin cell were prepared in the same manner as in Example 1 except that a non-flat plate-shaped silicate was used as the thickening agent. The silicate used had a thickness of 30 nm, a length of 34 nm in the longer direction, a length of 26 nm in the shorter direction, and an aspect ratio of the length in the shorter direction to the thickness of 0.9.

Comparative Example 5

An electrode and a coin cell were prepared in the same manner as in Comparative Example 4 except that $TiNb_2O_7$ was used as the negative electrode active material.

Comparative Example 6

An electrode and a coin cell were prepared in the same manner as in Comparative Example 4 except that natural graphite was used as the negative electrode active material.

TABLE 1

| | Negative electrode active material | Thickening agent | | | | |
|---|---|---|---|---|---|---|
| | | Composition | Thickness | Length in longer direction | Length in shorter direction | Aspect ratio |
| Example 1 | $Li_4Ti_5O_{12}$ | $Na_{0.6}Mg_{5.6}Li_{0.4}Si_8O_{20}(OH)_4$ | 10 nm | 100 nm | 80 nm | 8.0 |
| Example 2 | $Li_4Ti_5O_{12}$ | $Na_{0.6}Mg_{5.6}Li_{0.4}Si_8O_{20}(OH)_4$ | 2.0 nm | 62 nm | 35 nm | 17.5 |
| Example 3 | $Li_4Ti_5O_{12}$ | $Na_{0.6}Mg_{5.6}Li_{0.4}Si_8O_{20}(OH)_4$ | 1.2 nm | 38 nm | 18 nm | 15.0 |
| Example 4 | $TiNb_2O_7$ | $Na_{0.7}Mg_{5.45}Li_{0.4}Si_8O_{20}(OH)_4$ | 2.0 nm | 62 nm | 35 nm | 17.5 |
| Example 5 | $TiNb_2O_7$ | $Na_{0.7}Mg_{5.45}Li_{0.4}Si_8O_{20}(OH)_4$ | 1.0 nm | 35 nm | 18 nm | 18.0 |
| Example 6 | $TiNb_2O_7$ | $Na_{0.7}Mg_{5.45}Li_{0.4}Si_8O_{20}(OH)_4$ | 1.0 nm | 35 nm | 18 nm | 18.0 |
| Example 7 | $TiNb_2O_7$ | $Na_{0.7}Mg_{5.45}Li_{0.4}Si_8O_{20}(OH)_4$ | 100 nm | 1000 nm | 900 nm | 9.0 |
| Example 8 | $TiNb_2O_7$ | $Na_{0.7}Mg_{5.45}Li_{0.4}Si_8O_{20}(OH)_4$ | 0.2 nm | 5 nm | 4 nm | 20.0 |
| Example 9 | $TiNb_2O_7$ | $Na_{0.7}Mg_{5.45}Li_{0.4}Si_8O_{20}(OH)_4$ | 1.0 nm | 35 nm | 18 nm | 18.0 |
| Example 10 | $TiNb_2O_7$ | $Na_{0.7}Mg_{5.45}Li_{0.4}Si_8O_{20}(OH)_4$ | 1.0 nm | 35 nm | 18 nm | 18.0 |
| Example 11 | C | $Na_{0.7}Mg_{5.45}Li_{0.4}Si_8O_{20}(OH)_4$ | 10 nm | 100 nm | 80 nm | 8.0 |

| | Thickening agent addition amount (parts by mass) | Dispersing agent | Height of curving (mm) | Peeled area ratio (%) | Capacity retention ratio (%) after 50 cycles at 25° C. |
|---|---|---|---|---|---|
| Example 1 | 5.0 | None | 0 | 0 | 95 |
| Example 2 | 5.0 | None | 0 | 0 | 98 |
| Example 3 | 5.0 | None | 0 | 0 | 99 |
| Example 4 | 5.0 | None | 0 | 0 | 86 |
| Example 5 | 5.0 | None | 0 | 0 | 90 |
| Example 6 | 5.0 | 2 parts by mass of aliphatic amine salt | 0 | 0 | 94 |
| Example 7 | 5.0 | None | 0 | 0 | 81 |
| Example 8 | 5.0 | None | 0 | 0 | 75 |
| Example 9 | 1.0 | None | 0 | 0 | 91 |
| Example 10 | 2.0 | None | 0 | 0 | 94 |
| Example 11 | 5.0 | None | 0 | 0 | 74 |

TABLE 2

| | Negative electrode active material | Thickening agent | | | | |
|---|---|---|---|---|---|---|
| | | Composition | Thickness | Length in longer direction | Length in shorter direction | Aspect ratio |
| Comparative Example 1 | $Li_4Ti_5O_{12}$ | CMC | — | — | — | — |
| Comparative Example 2 | $TiNb_2O_7$ | CMC | — | — | — | — |
| Comparative Example 3 | C | CMC | — | — | — | — |
| Comparative Example 4 | $Li_4Ti_5O_{12}$ | $Na_{0.7}Mg_{5.45}Li_{0.4}Si_8O_{20}(OH)_4$ | 30 nm | 34 nm | 26 nm | 0.9 |
| Comparative Example 5 | $TiNb_2O_7$ | $Na_{0.7}Mg_{5.45}Li_{0.4}Si_8O_{20}(OH)_4$ | 30 nm | 34 nm | 26 nm | 0.9 |
| Comparative Example 6 | C | $Na_{0.7}Mg_{5.45}Li_{0.4}Si_8O_{20}(OH)_4$ | 30 nm | 34 nm | 26 nm | 0.9 |

| | Thickening agent addition amount (parts by mass) | Dispersing agent | Height of curving (mm) | Peeled area ratio (%) | Capacity retention ratio (%) after 50 cycles at 25° C. |
|---|---|---|---|---|---|
| Comparative Example 1 | 5.0 | None | 30 | 8 | 88 |
| Comparative Example 2 | 5.0 | None | 35 | 7 | 72 |
| Comparative Example 3 | 5.0 | None | 27 | 5 | 65 |
| Comparative Example 4 | 5.0 | None | 0 | 5 | 87 |
| Comparative Example 5 | 5.0 | None | 0 | 4 | 66 |
| Comparative Example 6 | 5.0 | None | 0 | 4 | 42 |

Results of Examples 1 to 11 were summarized in Table 1. Results of Comparative Examples 1 to 6 were summarized in Table 2.

In each of Tables 1 and 2, in the column of "Thickening agent addition amount", the mass of the thickening agent is shown as a ratio in a case where the mass of the active material particles was taken as 100. For example, in Example 1, it is indicated that 5.0 parts by mass of thickening agent is contained with respect to 100 parts by mass of the active material particles. In the column of "Aspect ratio", a ratio of the length in the shorter direction to the thickness is indicated.

Note that, with regard to Comparative Examples, in order to consider the decline in the effective capacity due to the peeling of the active material-containing layer, the capacity retention ratio after the cycle test was calculated by regarding the capacity in a case where it is assumed that the active material-containing layer is not peeled off as 100%.

Tables 1 and 2 demonstrate the following.

In any case of Examples 1 to 11 in each of which the active material-containing layer had contained a flat plate-shaped silicate, the one-side electrode was not curved, and the active material-containing layer was not peeled off and did not generate cracks. The capacity retention ratios according to these Examples 1 to 11 were excellent.

In any case of Examples 1 to 11 in each of which the aspect ratio was 5 to 25, an excellent capacity retention ratio was shown, in particular, in any case of Examples 1 to 6 and 9 to 11 in each of which the thickness of the flat plate-shaped silicate was within a range from 0.5 nm to 50 nm, and the length in the shorter direction was within a range from 10 nm to 300 nm, an excellent capacity retention ratio was achieved regardless of the kind of the active material.

Further, from the comparison of Example 5 with Example 6, it can be understood that in the case of Example 6 in which the active material-containing layer further had contained a dispersing agent, a capacity retention ratio superior to that in the case of Example 5 was achieved.

As shown in Table 2, in any case of the electrodes according to Comparative Examples 1 to 3 in each of which CMC had been contained as the thickening agent in place of the flat plate-shaped silicate, the electrode was largely curved, had many cracks associated with the curve, and had a high peeled area ratio of the active material-containing layer. As a result, in any case of these Comparative Examples 1 to 3, the capacity retention ratio was also inferior compared to those of Examples in each of which the same kind of active material had been used.

In any case of Comparative Examples 4 to 6 in each of which a non-flat plate-shaped silicate had been used, the viscosity of the slurry was insufficient, and therefore, precipitation of various particles was observed after application of the slurry. In addition, there were many aggregates in which the conductive agent and the like had been aggregated. Accordingly, it is considered that the fact that a uniform electrode was not obtained is a factor for the inferior cycle life properties. In any case of these Comparative Examples 4 to 6, the capacity retention ratio was also inferior compared to those of Examples in each of which the same kind of active material had been used.

According at least one of the embodiments and Examples described above, an electrode is provided. The electrode includes an active material-containing layer containing an active material and a flat plate-shaped silicate.

According to the electrode, a secondary battery having excellent cycle life properties can be achieved.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode, comprising:
an active material-containing layer comprising an active material and a flat plate-shaped silicate,
wherein the active material-containing layer does not comprise a carboxymethyl cellulose,
wherein a thickness of the flat plate-shaped silicate is within a range from 0.2 nm to 100 nm,
wherein a length in a shorter direction of the flat plate-shaped silicate is within a range from 3 nm to 900 nm, and
wherein an aspect ratio of the length in the shorter direction of the flat plate-shaped silicate to the thickness of the flat plate-shaped silicate is within a range from 5 to 25.

2. The electrode according to claim 1, wherein the thickness of the flat plate-shaped silicate is within a range from 0.5 nm to 50 nm.

3. The electrode according to claim 1, wherein the length in a shorter direction of the flat plate-shaped silicate is within a range from 10 nm to 300 nm.

4. The electrode according to claim 1, wherein a ratio of a mass of the flat plate-shaped silicate to a mass of the active material is within a range from 0.01 to 0.1 in the active material-containing layer.

5. The electrode according to claim 1, wherein the active material comprises a monoclinic niobium titanium composite oxide.

6. The electrode according to claim 1, wherein the flat plate-shaped silicate is at least one kind selected from the group consisting of hectorite, saponite, and montmorillonite.

7. The electrode according to claim 1, wherein
the active material-containing layer further comprises a dispersing agent, and
the dispersing agent is a water-soluble material having anionicity or cationicity.

8. A secondary battery comprising:
a positive electrode;
a negative electrode; and
an electrolyte, wherein
the negative electrode is the electrode according to claim 1.

9. A battery pack comprising
the secondary battery according to claim 8.

10. The battery pack according to claim 9, further comprising:
an external power distribution terminal; and
a protective circuit.

11. The battery pack according to claim 9, comprising
a plurality of the secondary batteries, wherein
the plurality of the secondary batteries are electrically connected in series, in parallel, or in a combination of series connection and parallel connection.

12. A vehicle comprising the battery pack according to claim 9.

13. The vehicle according to claim 12, further comprising a mechanism configured to convert kinetic energy of the vehicle into regenerative energy.

14. The electrode according to claim 1, wherein
the active material-containing layer comprises the active material, a conductive agent, a binder, and a thickening agent at ratios in a range from 70% by mass to 96% by mass or less, in a range from 2% by mass to 28% by mass, in a range from 2% by mass to 28% by mass, and in a range from 2% by mass to 28% by mass, respectively, and
the thickening agent consists of the flat plate-shaped silicate.

15. The electrode according to claim 1, wherein the flat plate-shaped silicate is a thickening agent.

16. The electrode according to claim 1, wherein a thickening agent is present in the active material-containing layer in a range of from 1 to 5 parts by mass.

* * * * *